United States Patent
Cuffney et al.

(10) Patent No.: US 11,868,779 B2
(45) Date of Patent: Jan. 9, 2024

(54) UPDATING METADATA PREDICTION TABLES USING A REPREDICTION PIPELINE

(71) Applicant: International Business Machines Corporation, Armonk, NY (US)

(72) Inventors: James Raymond Cuffney, Poughkeepsie, NY (US); Adam Benjamin Collura, Hopewell Junction, NY (US); James Bonanno, Liberty Hill, TX (US); Brian Robert Prasky, Campbell Hall, NY (US); Edward Thomas Malley, Eastchester, NY (US); Suman Amugothu, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/470,075

(22) Filed: Sep. 9, 2021

(65) Prior Publication Data

US 2023/0075992 A1    Mar. 9, 2023

(51) Int. Cl.
*G06F 9/38*    (2018.01)
(52) U.S. Cl.
CPC .......... *G06F 9/3806* (2013.01); *G06F 9/3844* (2013.01)
(58) Field of Classification Search
CPC ............................. G06F 9/3844; G06F 9/3848
See application file for complete search history.

(56) References Cited

U.S. PATENT DOCUMENTS

| | | | |
|---|---|---|---|
| 6,189,091 B1 * | 2/2001 | Col | G06F 9/3861 |
| | | | 712/228 |
| 10,409,609 B2 | 9/2019 | Bonanno et al. | |
| 10,423,419 B2 | 9/2019 | Bonanno et al. | |
| 10,423,420 B2 | 9/2019 | Bonanno et al. | |
| 2004/0210749 A1 * | 10/2004 | Biles | G06F 9/3848 |
| | | | 712/240 |

(Continued)

OTHER PUBLICATIONS

Adiga, Narasimha, et al. "The IBM z15 high frequency mainframe branch predictor industrial product." 2020 ACM/IEEE 47th Annual International Symposium on Computer Architecture (ISCA). IEEE, May 30, 2020-Jun. 3, 2020. pp. 27-39 (Year: 2020).*

(Continued)

*Primary Examiner* — Keith E Vicary
(74) *Attorney, Agent, or Firm* — Cantor Colburn LLP; Jeffrey Ingalls

(57) ABSTRACT

Aspects of the invention include a computer-implemented method of updating metadata prediction tables. The computer-implemented method includes establishing, in the metadata prediction tables, a prediction of how a set of instructions will resolve and identifying that the set of instructions is completed. The computer-implemented method also includes determining, upon completion of the set of instructions, whether prediction update queues (PUQs) associated with the set of instructions indicate that the set of instructions resolved in one of a plurality of prescribed manners relative to the prediction and deciding that the metadata predictions tables are candidates to be updated based on the PUQs indicating that the set of instructions resolved in one of the plurality of prescribed manners.

20 Claims, 10 Drawing Sheets

(56) References Cited

U.S. PATENT DOCUMENTS

| | | | | |
|---|---|---|---|---|
| 2006/0190710 A1* | 8/2006 | Rychlik | ................ | G06F 9/3806 |
| | | | | 712/240 |
| 2012/0124348 A1* | 5/2012 | Dundas | ................ | G06F 9/3844 |
| | | | | 712/240 |
| 2019/0324972 A1 | 10/2019 | Karpistsenko et al. | | |

OTHER PUBLICATIONS

Anonymous; "Advanced H.264 Intra_4x4 Prediction Pipeline Implementation"; IP.com No. IPCOM000186244D; Aug. 13, 2009; pp. 6.

Anonymous; "Loop Last Iteration Dynamic Prediction Update"; IP.com No. IPCOM0001T4961D;Sep. 29, 2008; pp. 4.

Anonymous; "Value Prediction Implementation"; IP.com No. IPCOM000263479D; Sep. 3, 2020; pp. 5.

Anonymous: "Amazon Machine Learning"; Developer Guide Version Latest; Developer Guide, AWS; 2016; pp. 146.

Anonymous; "MIPS Pipeline"; MIPS; Morgan Kaufman Publishers The Processor; Mar. 25, 2017; Chapter 4, The Processor, p. 84.

Kolinko, E. et al.; "Branch Prediction"; https://cseweb.ucsd.edu/classes/fa11/cse240A-a/Slides1/08_branchprediction.pdf; 2008; pp. 24.

* cited by examiner

Updates without Wk PUQ(all weak branches go thru Update pipeline)

| Prediction | Resolution | Update Needed? | Reprediction | Update |
|---|---|---|---|---|
| WT(1) | T(4) | Yes | WT(7) | ST(7) |
| WT(2) | T(5) | Yes | ST(8) | ST(8) |
| WT(3) | T(6) | Yes | ST(9) | ST(9) |

Updates 8-9 are unnecessary since we only needed 7 update to go from WT to ST

Updates With Wk PUQ

| Prediction | Resolution | Update Needed? | Reprediction | Update |
|---|---|---|---|---|
| WT(1) | T(4) | Yes | WT(7) | ST(7) |
| WT(2) | T(5) | No | | |
| WT(3) | T(6) | No | | |

Weak PUQ Example

FIG. 3

UPDATING METADATA PREDICTION TABLES USING A REPREDICTION PIPELINE

The present invention generally relates to prediction pipelines and more specifically, to a method of updating metadata prediction tables using a reprediction pipeline.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor can attempt to guess whether a conditional branch will be taken or not and can also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table (BHT) and a pattern history table (PHT). A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Embodiments of the present invention are directed to a computer-implemented method of updating metadata prediction tables.

A non-limiting example includes establishing, in the metadata prediction tables, a prediction of how a set of instructions will resolve and identifying that the set of instructions is completed. The computer-implemented method also includes determining, upon completion of the set of instructions, whether prediction update queues (PUQs) associated with the set of instructions indicate that the set of instructions resolved in one of a plurality of prescribed manners relative to the prediction and deciding that the metadata predictions tables are candidates to be updated based on the PUQs indicating that the set of instructions resolved in one of the plurality of prescribed manners.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a schematic diagram illustrating an operation of a weak prediction update queue (WeakPUQ) in accordance with one or more embodiments of the present invention;

Figure 1:
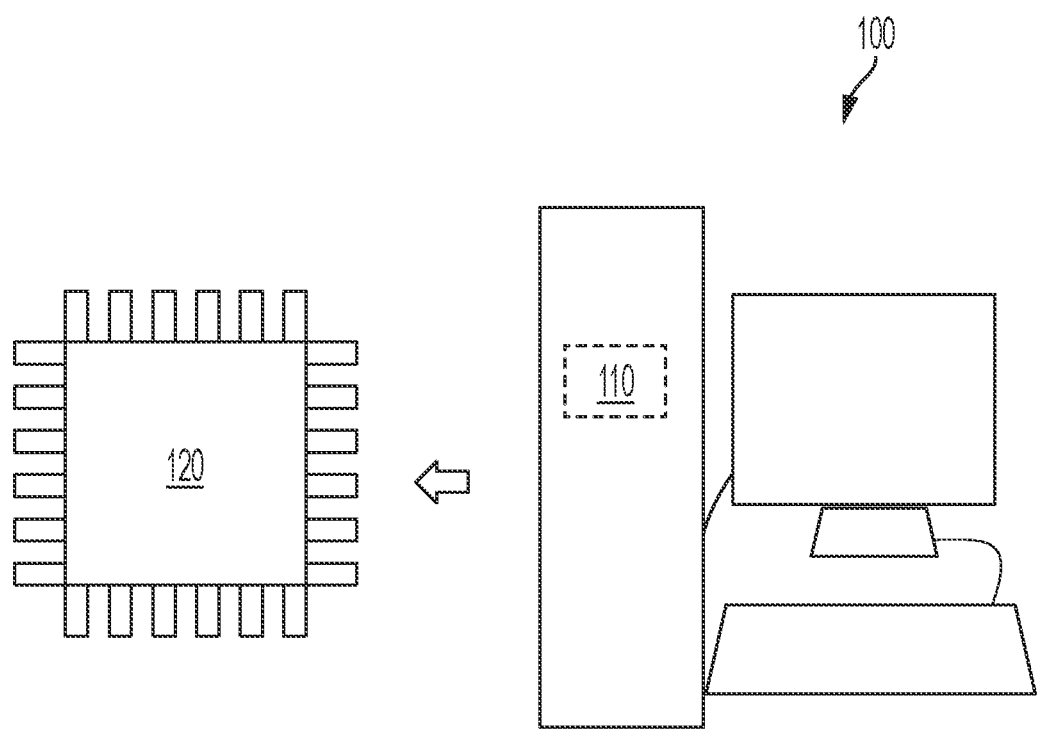
FIG. 1 illustrates a system to perform a computer-implemented method of chip design in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for an accurate and efficient method of determining whether any of the predictive structures that combined to create a prediction for a branch need to be updated. A set of structures are created to help to decide whether a specific execution pipeline pass of a branch needs to make an update to the branch's predictive structure. The use of the structures as well as a read-before-write model of completion time updates removes the need for a large portion of logic that tracks and applies speculative updates; hence reducing the latency of the critical prediction time pipeline for steering the instruction fetch and decode streams.

Branch data, such as a direction and a target address for example, is important to the performance of a general-purpose computing machine (e.g., mainframe machine) because it allows for predictive structures to get ahead of a current instruction to prepare the machine for where it will need to go in the future. As these predictive structures encounter a branch, they store the outcome of the completion of the branch in multiple different structures. This is so that when the branch is predicted again the machine can use the results of the previous execution of the branch to more accurately determine what the branch will do in the future. As such, being able to accurately update the data in these structures will allow the machine to increase performance in this area.

In addition, branches are very common instructions in a computing machine. Since branches are common, it is important to have a way to decide if a branch needs to make updates to its metadata or not. Previously, this has been done by saving the data from when the branch was predicted until when it completed. But this is costly in terms of silicon area and sometimes power usage especially when this data is transported since prediction and completion can be many cycles apart. For example, ages of the speculative entries in relation to update mechanisms were tracked in an attempt to predict whether a branch would need to be updated based on assuming that the prediction was correct and then tracking information of the branch through the pipeline.

A drawback of the previous solutions is that when a single branch is executed several times in quick succession there is often no way to communicate from dependent passes of the branch that a prior branch has already updated the predictive structures. In the previous solutions, the update mechanism was determined based on the prediction time information and how the branch completes. Since the previous solution does not factor in any updates that happened between the time the branch was predicted versus when it completes, those updates are excessive and potentially inaccurate. An example of how an inaccurate update is made would be if there were multiple instances of a branch that made updates to the strength of a branch, causing it to go from an initially weak state to a strong state, but the final instance of the branch gets a branch wrong. This branch wrong would not see the updated strong state and instead sees the outdated, and incorrect, weak state from the initial prediction and make the incorrect update based on seeing the stale weak state.

Another drawback is that the methods for determining if a branch needs to make an update are typically imprecise. In those cases, there is extra power consumed for writing the array and/or having updates that are unnecessary slow down the pipeline from making the updates that are necessary.

An additional drawback of the previous solutions is that the branch data from the prediction time was stored and carried through to completion time. This was so that as the branch resolved the prediction time information was available to decide what the update should be. This was costly as there is a lot of information that needed to be kept around for every branch. In many cases there is not a need for an update so that tracking is useless.

One or more embodiments of the present invention address one or more of the above-described shortcomings of the prior art by providing for creation of a set of side structures or prediction update queues (PUQs) that act as funnels to determine if a branch needs to go through an update pipeline based on the way the branch was predicted and how the branch completed. There are a finite number of reasons why a branch might need to go through to the update logic at completion time. Several of these reasons can be detected at completion time through minimal data tracking in conjunction with the result of the branch execution. These reasons will always need an update to occur for that branch and thus are always passed through to have the update occur. For the remaining reasons the PUQs are split up by reason and when a branch completes it is checked against each of the PUQs. A match against either of the PUQs indicates that the branch needs to head through to the update pipeline. The update pipeline will be repredicting the branch at completion time through reading the data from the predictive structures out and going through the same predictive mechanisms in conjunction with the result from the completion of the branch to determine the correct state to update to. By going through the same process of how a branch is predicted and knowing how the branch completed, the update pipeline can determine the correct updates without having to carry around a lot of data through the overall pipeline from prediction to completion.

The present invention thus reduces logical complexity during the prediction pipeline and potentially the silicon area needed to track extra information through the pipeline. Also, the PUQ structures reduce the amount of data needed to be tracked through the execution pipeline. The PUQ structures only need to match the IA of a given branch to indicate that branch needs to go through the update pipeline regardless of how the branch completes. In addition, the PUQ's allow for maintaining branch information for branches that are going to need an update.

Using the reprediction pipeline, it is no longer necessary to store all of the prediction time information in a side structure to track through the pipeline. Since the data will go through a process of repredicting the branch at completion and knowing how the branch completed the pipeline knows what updates are needed. Thus, almost all the data tracking from prediction time through to completion can be removed which potentially reduces overall silicon area and power usage by the core.

FIG. 1 is a block diagram of a system 100 to perform a computer-implemented method of updating branch prediction according to embodiments of the invention. The system 100 includes processing circuitry 110 used to generate the design that is ultimately fabricated into an integrated circuit 120. The steps involved in the fabrication of the integrated circuit 120 are well-known and briefly described herein. Once the physical layout is finalized, according to embodiments of the invention, to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 9.

Figure 2:
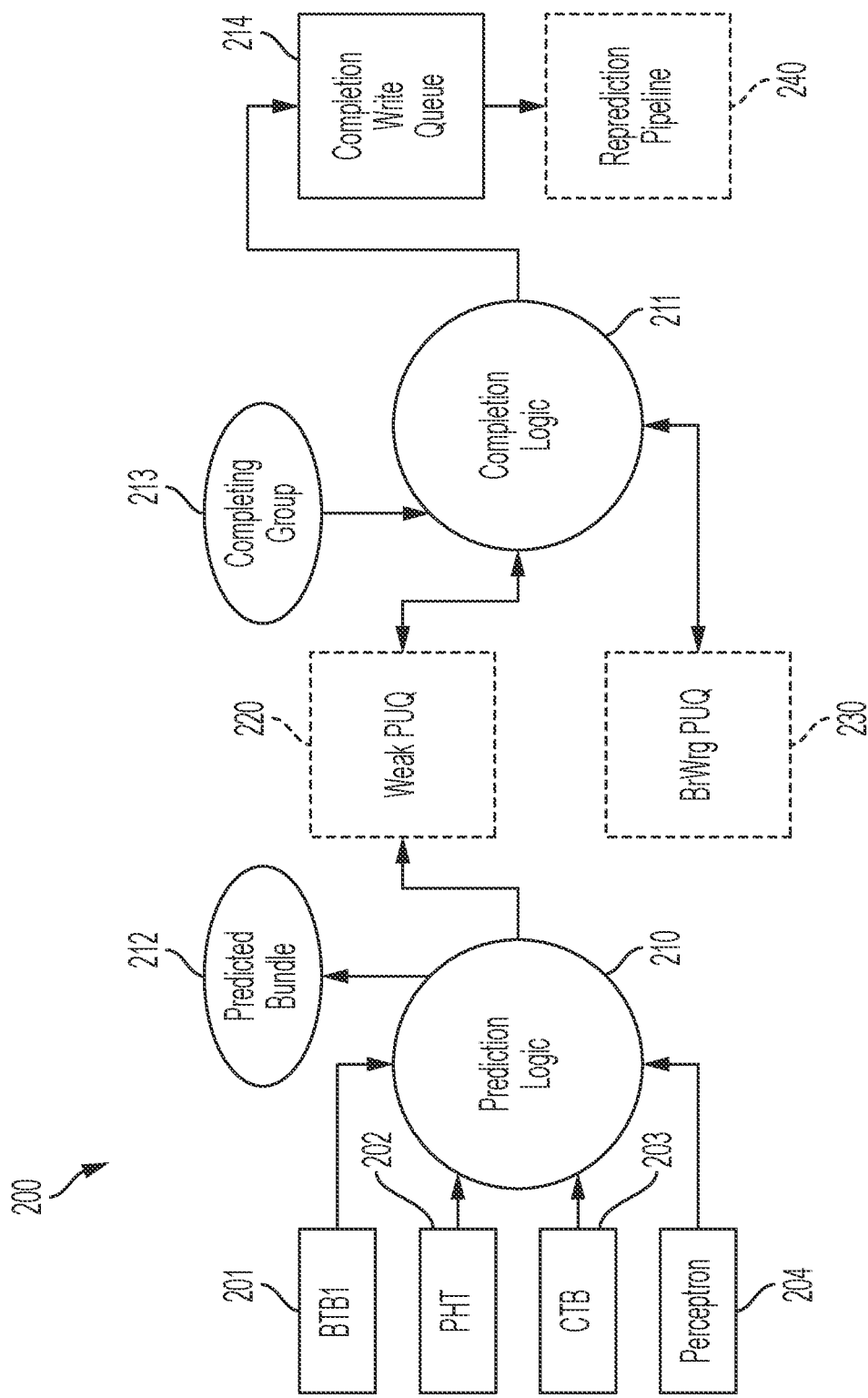
FIG. 2 is a schematic diagram of a system for updating branch prediction according to one or more embodiments of the present invention.
Figure 8:
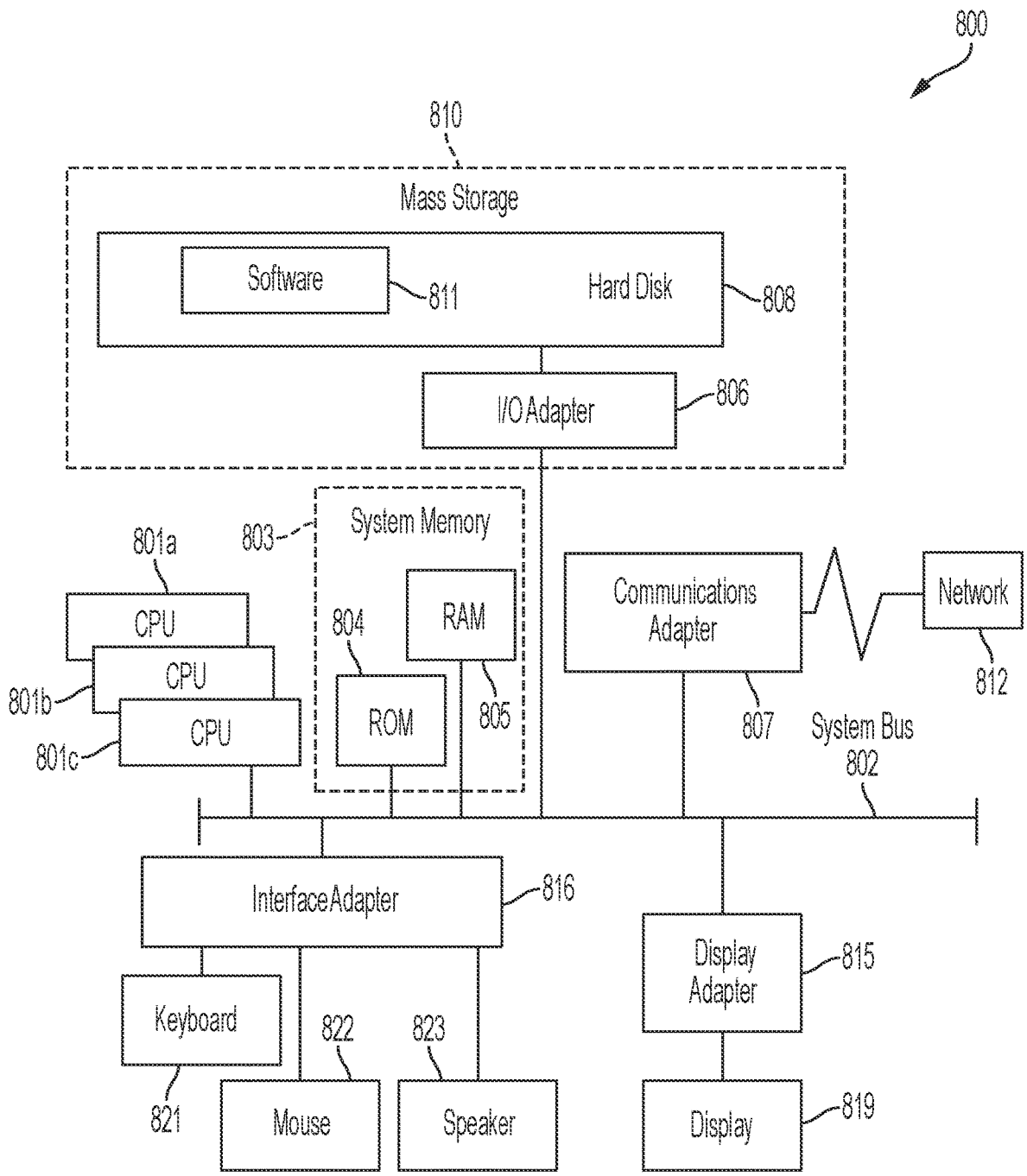
FIG. 8 is a schematic diagram of a computer system for executing a method of updating branch prediction in accordance with one or more embodiments of the present invention.

With reference to FIG. 2, a system 200 for updating branch prediction is provided and can be executed or embodied in the computer system 800 of FIG. 8. As shown in FIG. 2, the system 200 includes a branch target buffer (BTB) 201, a pattern history table (PHT) 202, a changing target buffer (CTB) 203 and a perceptron 204. The system 200 further includes prediction logic 210, completion logic 211, a WeakPUQ 220, a branch wrong PUQ (BrWrgPUQ) 230, a completion write queue 214 and a reprediction pipeline 240. The prediction logic 210 is communicative with a predicted bundle unit 212 and the WeakPUQ 220. The completion logic 211 is communicative with the WeakPUQ 220, the BrWrgPUQ 230, a completing group unit 213 and a completion write queue 214. The reprediction pipeline 240 is communicatively interposed between the completion write queue 214 and the BTB 201, PHT 202, the CTB 203, and the perceptron 204.

When a branch is predicted by the BTB 201 or any of the auxiliary structures (i.e., the PHT 202, the CTB 203 and the perceptron 204) that help determine the characteristics of a branch, most notably the direction and target address, the prediction logic 210, the completion logic 211, the Weak-PUQ 220 and the BrWrgPUQ 230 cooperatively determine whether that branch is a candidate for update when the branch completes. In particular, the WeakPUQ 220 and the BrWrgPUQ 230 determine if a branch needs to be sent for an update and, when, it is determined that a branch needs to be sent for an update, data representative of the branch is written into the completion write queue 214.

Surprise branches and branches that are dynamic but get a wrong target or direction will always need to be sent thru the update pipeline. A surprise branch is a branch which is not predicted and learned about as a function of an instruction decode. These types of branches can be identified at completion time by saving a very small amount of data, such as the predicted direction and target. In addition, there are some other types of dynamic branches that can also be identified at completion time and there is not a need for excess information to make the necessary updates. The WeakPUQ 220 tracks the information and determine that an update is necessary at completion time.

Surprise branches and branches that are dynamic but get a wrong target or direction will always need to be sent through the update pipeline. A surprise branch is a branch which is not predicted and learned about as a function of an instruction decode. These types of branches can be identified at completion time by saving a very small amount of data, such as the predicted direction and target. In addition, there are some other types of dynamic branches that can also be identified at completion time and there is not a need for excess information to make the necessary updates. The WeakPUQ 220 tracks the information and determine that an update is necessary at completion time.

With reference to FIG. 3, an exemplary scenario of an operation of the WeakPUQ 220 is illustrated. As shown in FIG. 3, Branch A, Branch B and Branch C are provided. Branch A is predicted in a weak taken state and is placed into the WeakPUQ 220 (Point 1). Branch A resolves as taken (Point 4) and matches in the Weak PUQ 220, which means we need an update and so Branch A is updated from weak taken to strong taken (Point 7). At Point 4 the entry that matched Branch A is invalidated in the Weak PUQ 200. For Branches B and C the prediction, resolution and update are all for separate instances of the same branch and since there is no matching entry in the Weak PUQ 220, since it was invalidated at Point 4 when Branch A matched against it, when these branches complete (Points 5 and 6 respectively) these branches are not sent through to the update pipeline (Points 8 and 9 are excessive and do not occur in an implementation with the Weak PUQ 200). Thus, only the entry for Branch A goes to the update pipeline.

The BrWrgPUQ 230 works differently than the WeakPUQ 220 because the BrWrgPUQ 230 is designed to go after a different set of branches. The BrWrgPUQ 230 is designed to go after future instances of branches that are predicted in a strong state, SNT (strongly-not-taken) or ST (strongly-taken), that at completion time resolve with a wrong direction before the update for that branch in a strong state has been processed by the reprediction pipeline 240. Since the branch resolves with a wrong direction, that branch will be passed along to the update pipeline and at the same time this branch will be installed into the BrWrgPUQ 230. The BrWrgPUQ 230 is going after branches that have the same IA and were predicted after the initial branch, but before it completed updating, and resolved with a correct direction prediction. For example, a future instance of the same branch that caused an install into the BrWrgPUQ 230 that completes without a branch wrong and was predicted in a strong state, but matches in the BrWrgPUQ 230, will be sent through to the reprediction pipeline 240. In this case, those branches would have seen an incorrect state at prediction time, because the update to that state had not occurred yet from the completion of the first instance, and since they resolved in a manner that if predicted weak would cause an update, they would miss this update. But the BrWrgPUQ 230 is there to catch this case so the branches know to go through the update pipeline. That means that this PUQ has entries created and invalidated at completion time, whereas the Weak PUQ 220 has entries created at prediction time and invalidated at completion time.

Figure 4:
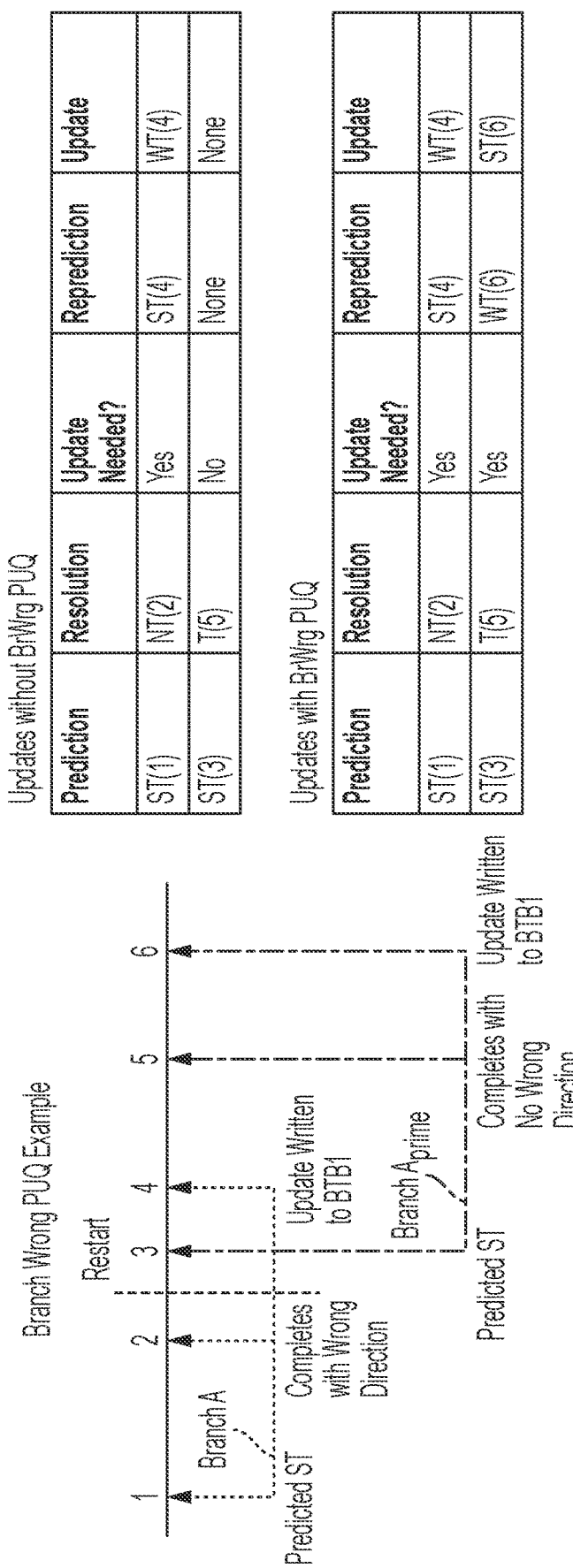
FIG. 4 is a schematic diagram illustrating an operation of a branch wrong PUQ (BrWrgPUQ) in accordance with one or more embodiments of the present invention.

With reference to FIG. 4, an exemplary scenario of an operation of the BrWrgPUQ 230 is illustrated. As shown in FIG. 4, Branch A is predicted in a strong taken (ST) state. Since it is in a strong taken state, it is not put into the WeakPUQ 220. (Point 1). Branch A resolves as not taken, which is a wrong direction (Point 2) and Branch A goes to the update pipeline to have the branch state updated for that branch. Branch A also creates an entry in the BrWrgPUQ 230. After the restart following the branch wrong direction, Branch $A_{prime}$ is predicted in a strong state before the update for Branch A has completed (Point 3). Branch $A_{prime}$ has the same instruction address as Branch A, such as if there is a loop and we see the same branch predicted multiple times. Branch A completes its update process (Point 4). When Branch $A_{prime}$ completes correctly with a resolved taken outcome it would normally not automatically know an update is necessary since it was predicted in a strong state and resolved correctly (Point 5). Branch $A_{prime}$ checks and finds a match in BrWrgPUQ 230. This tells Branch $A_{prime}$ it needs to go through the update pipeline because it has extra information from the resolution of Branch A. Branch $A_{prime}$ then goes through the update pipeline and updates from the WT state back to a ST state (Point 6).

Figure 5:
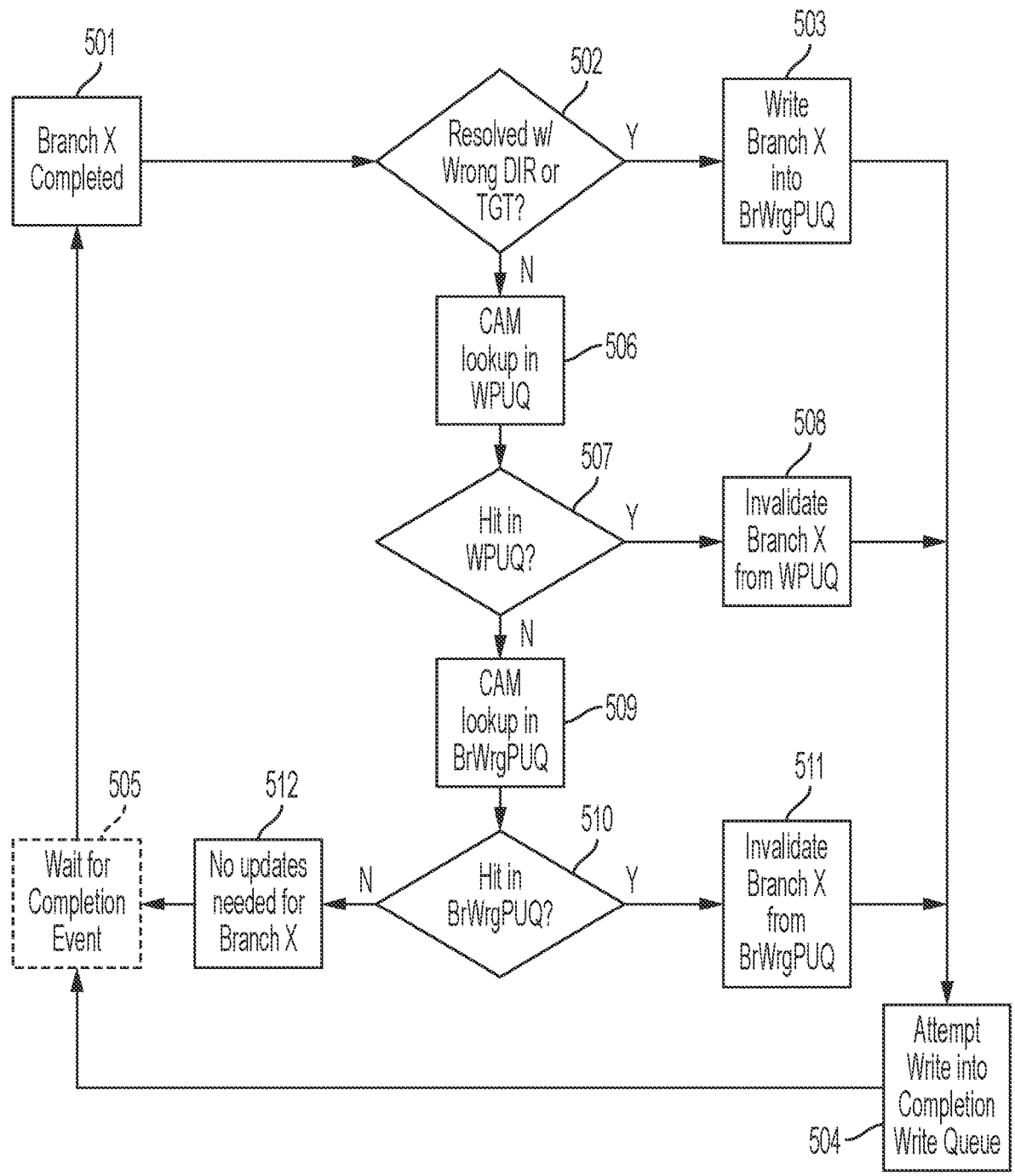
FIG. 5 is a flow diagram illustrating operations of the WeakPUQ and the BrWrgPUQ in accordance with one or more embodiments of the present invention.

With reference to FIG. 5, operations of the WeakPUQ 220 and the BrWrgPUQ 230 will now be described.

At an initial instance, Branch X is completed 501 and it is determined whether Branch X resolved with a wrong direction or target 502. In an event Branch X resolved with a wrong direction or target, an entry for Branch X is written in the BrWrgPUQ 230 at 503 and an attempt is made to write the entry for Branch X into a completion write queue 504. If the completion write queue 504 is full and unable to accept the write for Branch X this data is not installed into the completion write queue. This is followed by awaiting a completion event 505 and the completion of Branch X at 501. In an event Branch X did not resolve with a wrong direction or target, an entry for Branch X is looked for in the WeakPUQ 220 at 506 and it is determined if there is a hit in the WeakPUQ 220 at 507. If there is a hit, the entry for Branch X is invalidated from the WeakPUQ 220 at 508 whereupon control proceeds to 504. Conversely, if there is no hit, the entry for Branch X is looked for in the BrWrgPUQ 230 at 509 and it is determined if there is a hit at 510. If there is a hit, the entry for Branch X is invalidated from the BrWrgPUQ 230 at 511 whereupon control proceeds to 504. Conversely, if there is no hit, it is found that no updates are needed for Branch X at 512 and control proceeds to 505.

With reference back to FIG. 2, the reprediction pipeline 240 serves to execute a reprediction for a branch once the branch enters the update pipeline. That is, once a branch is determined that it should go through the update pipeline, the last step before the process completes is to do the update to the branch state. Since most of the data tracking has been removed from the process, the repredicting of the branch is done at completion time. The logic of the reprediction pipeline 240 reads the data from the arrays and that is where the reprediction pipeline 240 picks up the branch data instead of from information tracked through the pipeline. With the most current data, it becomes possible to determine the necessary updates for the branch and, once the updates are determined, the logic of the reprediction pipeline 240 writes the data back to update the arrays.

Figure 6:
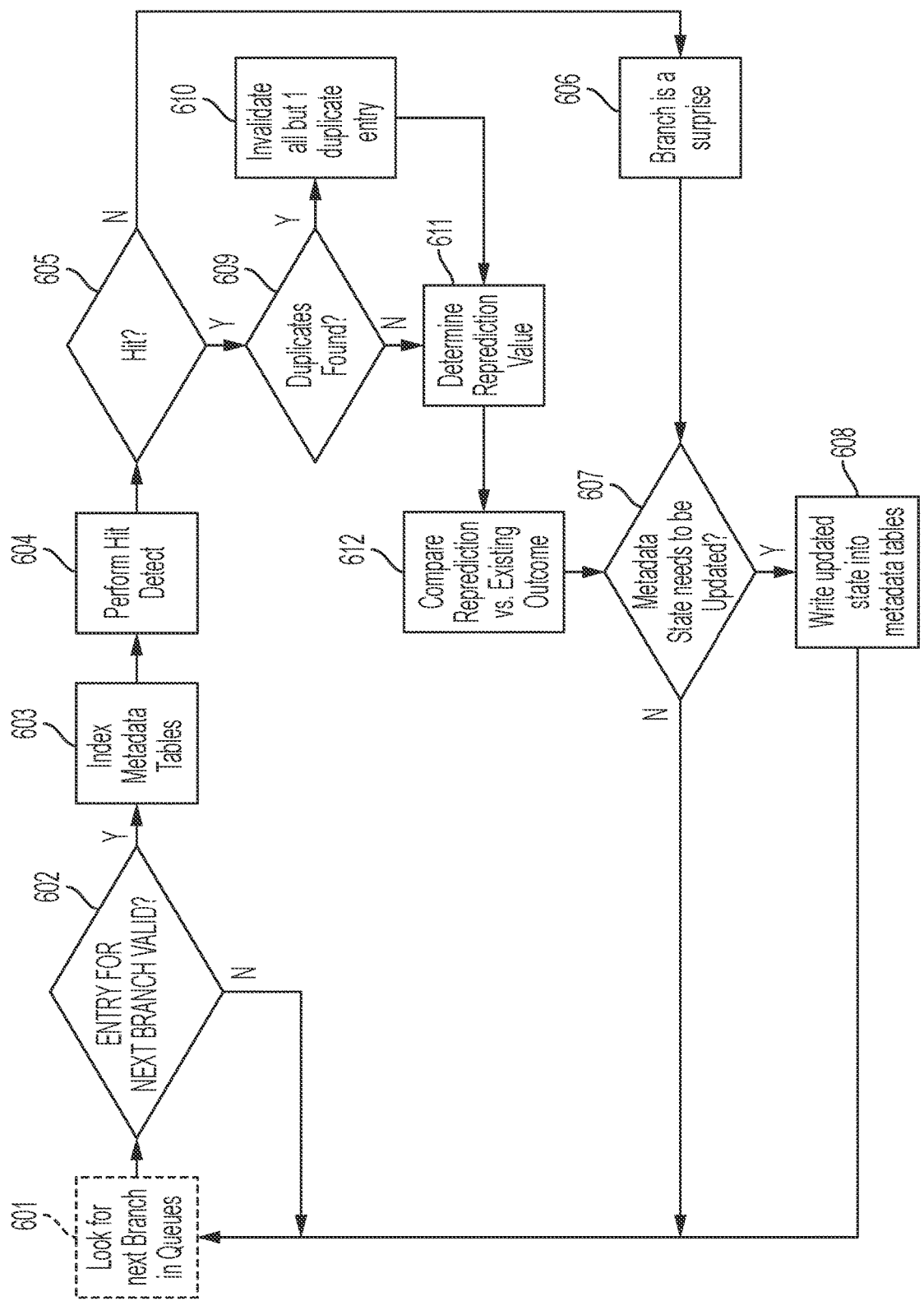
FIG. 6 is a flow diagram illustrating operations of a reprediction pipeline in accordance with one or more embodiments of the present invention.

With reference to FIG. 6, an operation of the reprediction pipeline will now be described.

Initially an entry for a next branch is looked for in the completion write queue 214 at 601 and it is determined if the entry for the next branch is valid at 602. In an event the entry is not valid, control reverts to 601. In an event the entry is valid, metadata tables of one or more of the BTB_201, the PHT 202, the CTB 203 and the perceptron 204 are indexed at 603, a hit detect is performed at 604 and it is determined whether a hit occurred at 605. If no hit occurred, it is found that the branch is a surprise at 606 and it is determined whether a metadata state needs to be updated at 607. In an event the metadata state needs to be updated, the updated state is written into the metadata tables at 608 and control proceeds to 601. If a hit occurred, it is determined whether duplicates are found at 609 and, if duplicates are found, all but one duplicate entry is invalidated at 610, a reprediction value is determined at 611, the reprediction value is compared with the existing outcome at 612 and control proceeds to 607. If no duplicates are found, control immediately proceeds to 611.

Figure 7A:
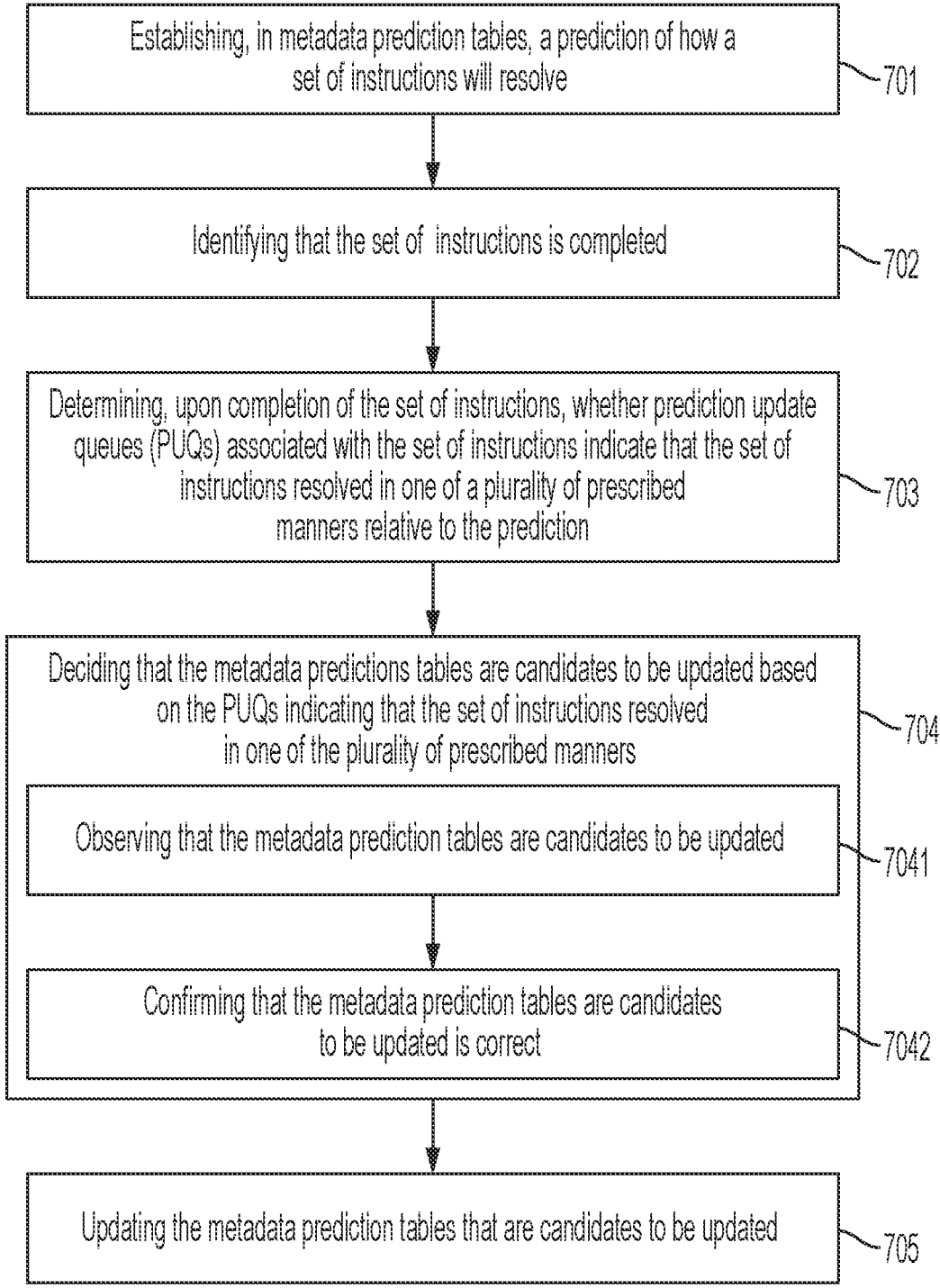
FIG. 7A is a flow diagram illustrating a computer-implemented method of updating metadata prediction tables in accordance with one or more embodiments of the present invention.

With reference to FIG. 7A, a computer-implemented method of updating metadata prediction tables is provided as generally described above. The computer-implemented method includes establishing, in the metadata prediction tables, a prediction of how a set of instructions will resolve (701) and identifying that the set of instructions is completed (702). The computer-implemented method also includes determining, upon completion of the set of instructions, whether prediction update queues (PUQs) associated with the set of instructions indicate that the set of instructions resolved in one of a plurality of prescribed manners relative to the prediction (703) and deciding that the metadata predictions tables are candidates to be updated based on the PUQs indicating that the set of instructions resolved in one of the plurality of prescribed manners (704). In addition, the method can include updating the characteristics of the metadata prediction tables that are candidates to be updated in accordance with results of the deciding (705).

In accordance with one or more embodiments of the present invention, the deciding that the characteristics of the metadata prediction tables are candidates to be updated of operation 704 can include determining that the set of instructions resolved with a wrong target, with a wrong direction or as a surprise, determining that the characteristics of the metadata prediction tables need to be strengthened or weakened or determining that the set of instructions resolved as a wrong branch. It is to be understood, however, that other embodiments exist and that the deciding that the characteristics of the metadata prediction tables are candidates to be updated of operation 704 can involve other determinations, conclusions, etc.

In any case, the deciding that the characteristics of the metadata prediction tables are candidates to be updated of operation 704 is enabled by the capability of the WeakPUQ 220 to track sets of instructions that will need updates at completion time based on assumed correctness of the prediction and the capability of the BrWrgPUQ 230 to track sets of instructions that will need updates based on how multiple instances of each of the sets of instructions complete. Thus, the deciding that the characteristics of the metadata prediction tables are candidates to be updated of operation 704 can further include observing that the characteristics of the metadata prediction tables are candidates to be updated (7041) and confirming that the characteristics of the metadata prediction tables are candidates to be updated is correct (7042).

As an example, for a case in which the characteristics of the metadata prediction tables are in a predefined state (i.e., an unsaturated state) as an update, which encompasses strengthen/weaken updates, the observing of operation 7041 and the confirming of operation 7042 will be described below. The observing of operation 7041 occurs when the prediction is established in the metadata prediction tables and includes assuming that an update will be needed in an event the set of instructions resolves as expected and writing data representing the set of instructions and the prediction into a PUQ, such as the WeakPUQ 220, as an entry. The confirming of operation 7042 occurs upon the completion of the set of instructions and includes comparing the data of a completing instruction with data representing previous sets of instructions written into the PUQ as previous entries. The confirming of operation 7042 further includes determining whether there is a match between the data representing the set of instructions and the data representing previous sets of instructions in the PUQ, invalidating the entry in an event of a match and confirming that the characteristics of the metadata prediction tables should be updated.

As another example, for a case in which the characteristics of the metadata prediction tables should be changed to account for a branch wrong instance as an update, the observing of operation 7041 and the confirming of operation 7042 will be described below. The observing of operation 7041 occurs upon completion of first and second instances of the set of instructions and includes respectively writing data representing the first instance of the set of instructions and the prediction into a PUQ, such as the BrWrgPUQ 230. The confirming of operation 7042 occurs upon completion of a second instance of the set of instructions and includes comparing the second data with data representing previous sets of instructions written into the PUQ as previous entries, determining whether there is a match between the second data representing the second set of instructions and the data representing previous sets of instructions in the PUQ, invalidating the entry in an event of a match and confirming that the characteristics of the metadata prediction tables should be changed to account for a branch wrong instance.

As used herein, the metadata prediction tables can include one or more selected from the group consisting of the BTB 201, the PHT 202, the CTB 203 and the perceptron 204.

Figure 7B:
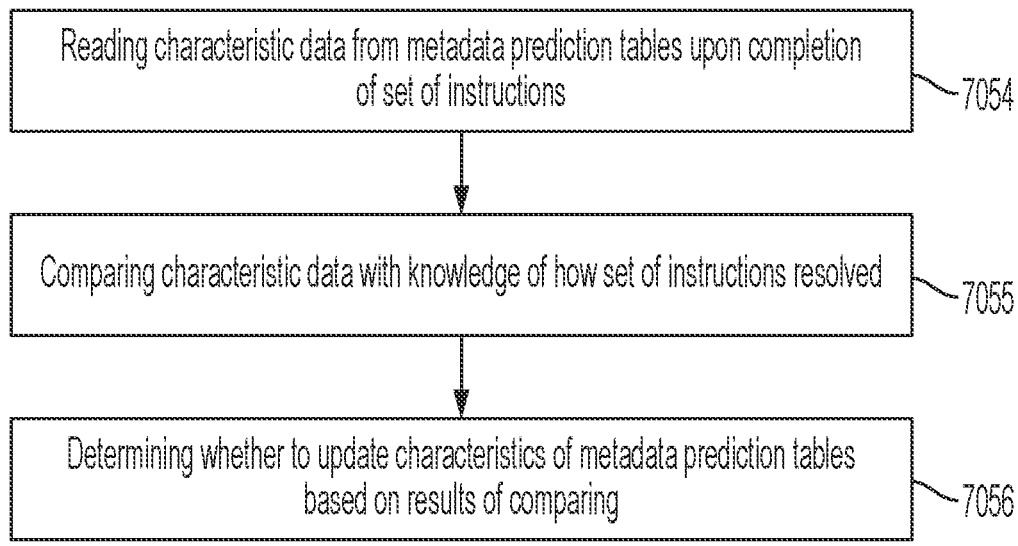
FIG. 7B is a flow diagram illustrating a computer-implemented method of updating metadata prediction tables in accordance with one or more further embodiments of the present invention.

With reference to FIG. 7B, a computer-implemented method of executing the updating of the characteristics of the metadata prediction tables that are candidates to be updated of operation 705 is provided as an additional set of operations for the method of FIG. 7A. As shown in FIG. 7B, the computer-implemented method of executing the updating of the characteristics of the metadata prediction tables that are candidates to be updated of operation 705 includes reading characteristic data from the metadata prediction tables upon completion of the set of instructions (7054), comparing the characteristic data with knowledge of how the set of instructions resolved (7055) and determining whether to update the characteristics of the metadata prediction tables based on results of the comparing (7056).

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801a, 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 9:
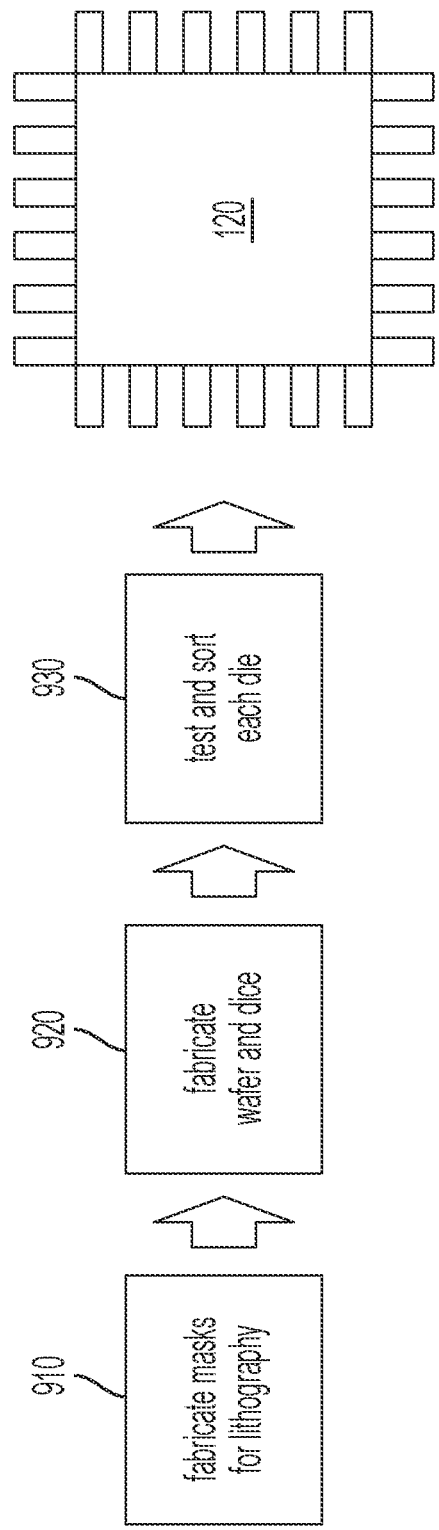
FIG. 9 is a process flow of a method of fabricating an integrated circuit according to exemplary embodiments of the invention.

FIG. 9 is a process flow of a method of fabricating an integrated circuit according to exemplary embodiments of the invention. Once the physical design data is obtained, based, in part, on the computer-implemented method of updating branch prediction described herein, the integrated circuit 120 can be fabricated according to known processes that are generally described with reference to FIG. 9. Generally, a wafer with multiple copies of the final design is fabricated and cut (i.e., diced) such that each die is one copy of the integrated circuit 120. At block 910, the processes include fabricating masks for lithography based on the finalized physical layout. At block 920, fabricating the wafer includes using the masks to perform photolithography and etching. Once the wafer is diced, testing and sorting each die is performed, at block 930, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of updating metadata prediction tables, the computer-implemented method comprising:
   establishing, in the metadata prediction tables, a prediction of how a set of instructions will resolve;
   identifying that the set of instructions is completed;
   determining, upon completion of the set of instructions, whether prediction update queues (PUQs) associated with the set of instructions indicate that the set of instructions resolved in one of a plurality of prescribed manners relative to the prediction;

deciding that the metadata prediction tables are candidates to be updated based on the PUQs indicating that the set of instructions resolved in one of the plurality of prescribed manners; and updating the metadata prediction tables in accordance with results of the deciding.

2. The computer-implemented method according to claim 1, wherein the deciding that the metadata prediction tables are candidates to be updated comprises determining how the set of instructions resolved.

3. The computer-implemented method according to claim 1, wherein the deciding that the metadata prediction tables are candidates to be updated comprises confirming that the metadata prediction tables are candidates to be updated is correct.

4. The computer-implemented method according to claim 3, wherein, for a case in which the metadata prediction tables are in a predefined state:

the confirming occurs upon the completion of the set of instructions and comprises comparing data representing the set of instructions with data representing previous sets of instructions written into one of the PUQs as previous entries and determining whether there is a match between the data representing the set of instructions and the data representing previous sets of instructions in the one of the PUQs.

5. The computer-implemented method according to claim 3, wherein, for a case in which the metadata prediction tables should be changed to account for a branch wrong instance:

the confirming occurs upon completion of a second instance of the set of instructions and comprises comparing second data representing the second instance of the set of instructions with data representing previous sets of instructions written into one of the PUQs as previous entries and determining whether there is a match between the second data representing the second instance of the set of instructions and the data representing previous sets of instructions in the one of the PUQs.

6. The computer-implemented method according to claim 1, wherein the deciding is enabled by:

a weak prediction update queue (WeakPUQ) to track first sets of instructions that will need updates at completion time based on assumed correctness of predictions; and a branch wrong PUQ (BrWrgPUQ) to track second sets of instructions that will need updates based on how multiple instances of each of the first and second sets of instructions complete.

7. The computer-implemented method according to claim 1, wherein the updating of the metadata prediction tables comprises:

reading characteristic data from the metadata prediction tables upon completion of the set of instructions;

comparing the characteristic data with knowledge of how the set of instructions resolved; and determining whether to update the metadata prediction tables based on results of the comparing.

8. A computer readable storage medium for updating metadata prediction tables, the computer readable storage medium comprising:

a memory having executable instructions stored thereof for causing a processor to carry out a method comprising:

establishing, in the metadata prediction tables, a prediction of how a set of instructions will resolve;

identifying that the set of instructions is completed;

determining, upon completion of the set of instructions, whether prediction update queues (PUQs) associated with the set of instructions indicate that the set of instructions resolved in one of a plurality of prescribed manners relative to the prediction;

deciding that the metadata prediction tables are candidates to be updated based on the PUQs indicating that the set of instructions resolved in one of the plurality of prescribed manners; and updating the metadata prediction tables in accordance with results of the deciding.

9. The computer readable storage medium according to claim 8, wherein the deciding that the metadata prediction tables are candidates to be updated comprises determining how the set of instructions resolved.

10. The computer readable storage medium according to claim 8, wherein the deciding that the metadata prediction tables are candidates to be updated comprises confirming that the metadata prediction tables are candidates to be updated is correct.

11. The computer readable storage medium according to claim 10, wherein, for a case in which the metadata prediction tables are in a predefined state:

the confirming occurs upon the completion of the set of instructions and comprises comparing data representing the set of instructions with data representing previous sets of instructions written into one of the PUQs as previous entries and determining whether there is a match between the data representing the set of instructions and the data representing previous sets of instructions in the one of the PUQs.

12. The computer readable storage medium according to claim 10, wherein, for a case in which the metadata prediction tables should be changed to account for a branch wrong instance:

the confirming occurs upon completion of a second instance of the set of instructions and comprises comparing second data representing the second instance of the set of instructions with data representing previous sets of instructions written into one of the PUQs as previous entries and determining whether there is a match between the second data representing the second instance of the set of instructions and the data representing previous sets of instructions in the one of the PUQs.

13. The computer readable storage medium according to claim 8, wherein the deciding is enabled by:

a weak prediction update queue (WeakPUQ) to track first sets of instructions that will need updates at completion time based on assumed correctness of predictions; and a branch wrong PUQ (BrWrgPUQ) to track second sets of instructions that will need updates based on how multiple instances of each of the first and second sets of instructions complete.

14. The computer readable storage medium according to claim 8, wherein the updating of the metadata prediction tables comprises:

reading characteristic data from the metadata prediction tables upon completion of the set of instructions;

comparing the characteristic data with knowledge of how the set of instructions resolved; and determining whether to update the metadata prediction tables based on results of the comparing.

15. A system for updating metadata prediction tables, the system comprising:

a memory having computer readable instructions; and one or more processors for executing the computer readable instructions, the computer readable instructions controlling the one or more processors to perform operations comprising:

establishing, in the metadata prediction tables, a prediction of how a set of instructions will resolve;

identifying that the set of instructions is completed;

determining, upon completion of the set of instructions, whether prediction update queues (PUQs) associated with the set of instructions indicate that the set of instructions resolved in one of a plurality of prescribed manners relative to the prediction;

deciding that the metadata prediction tables are candidates to be updated based on the PUQs indicating that the set of instructions resolved in one of the plurality of prescribed manners; and updating the metadata prediction tables in accordance with results of the deciding.

16. The system according to claim 15, wherein the deciding that the metadata prediction tables are candidates to be updated comprises determining how the set of instructions resolved.

17. The system according to claim 15, wherein the deciding that the metadata prediction tables are candidates to be updated comprises confirming that the metadata prediction tables are candidates to be updated is correct, and wherein, for a case in which the metadata prediction tables are in a predefined state:

the confirming occurs upon the completion of the set of instructions and comprises comparing data representing the set of instructions with data representing previous sets of instructions written into one of the PUQs as previous entries and determining whether there is a match between the data representing the set of instructions and the data representing previous sets of instructions in the one of the PUQs.

18. The system according to claim 15, wherein the deciding that the metadata prediction tables are candidates to be updated comprises confirming that the metadata prediction tables are candidates to be updated is correct, and wherein, for a case in which the metadata prediction tables should be changed to account for a branch wrong instance:

the confirming occurs upon completion of a second instance of the set of instructions and comprises comparing second data representing the second instance of the set of instructions with data representing previous sets of instructions written into one of the PUQs as previous entries and determining whether there is a match between the second data representing the second instance of the set of instructions and the data representing previous sets of instructions in the one of the PUQs.

19. The system according to claim 15, wherein the deciding is enabled by:

a weak prediction update queue (WeakPUQ) to track first sets of instructions that will need updates at completion time based on assumed correctness of predictions; and a branch wrong PUQ (BrWrgPUQ) to track second sets of instructions that will need updates based on how multiple instances of each of the first and second sets of instructions complete.

20. The system according to claim 15, wherein the updating of the metadata prediction tables comprises:

reading characteristic data from the metadata prediction tables upon completion of the set of instructions;

comparing the characteristic data with knowledge of how the set of instructions resolved; and determining whether to update the metadata prediction tables based on results of the comparing.

* * * * *